(12) United States Patent
Shin

(10) Patent No.: US 9,261,748 B2
(45) Date of Patent: Feb. 16, 2016

(54) LIQUID CRYSTAL DISPLAY DEVICE HAVING REDUCED-SIZED LIGHT LEAKAGE AREA

(71) Applicant: Hydis Technologies Co., Ltd., Gyeonggi-do (KR)

(72) Inventor: Chul Shin, Seoul (KR)

(73) Assignee: Hydis Technologies Co., Ltd., Icheon-si, Gyeonggi-do (KR)

( * ) Notice: Subject to any disclaimer, the term of this patent is extended or adjusted under 35 U.S.C. 154(b) by 0 days.

(21) Appl. No.: 14/139,928

(22) Filed: Dec. 24, 2013

(65) Prior Publication Data
US 2015/0084845 A1 Mar. 26, 2015

(30) Foreign Application Priority Data

Sep. 24, 2013 (KR) .......................... 10-2013-0113385

(51) Int. Cl.
G09G 3/36 (2006.01)
G02F 1/1362 (2006.01)
G02F 1/1335 (2006.01)

(52) U.S. Cl.
CPC .... *G02F 1/136286* (2013.01); *G02F 1/133512* (2013.01)

(58) Field of Classification Search
CPC ... G02F 1/1343; G02F 1/1345; G02F 1/1335; G09G 3/36; G09G 3/30; G09G 3/34
USPC .................. 345/76, 87, 92; 349/44, 142, 143
See application file for complete search history.

(56) References Cited

U.S. PATENT DOCUMENTS

| | | | |
|---|---|---|---|
| 8,274,616 B2 * | 9/2012 | Shin et al. ........................ | 349/39 |
| 2005/0219436 A1 * | 10/2005 | Kwon et al. .................... | 349/44 |
| 2010/0151606 A1 * | 6/2010 | Kim et al. ........................ | 438/30 |
| 2011/0149224 A1 * | 6/2011 | Tseng et al. .................. | 349/142 |

OTHER PUBLICATIONS

Abstract of Japanese Patent—JPH0490513 dated Mar. 24, 1992, 2 pages.
Abstract of Japanese Patent—JPH04264529 dated Sep. 21, 1992, 2 pages.
Abstract of Japanese Patent—JP2000098427 dated Apr. 7, 2000, 2 pages.
Abstract of Japanese Patent—JP2000098427, dated Apr. 7, 2000, 2 pages.
Abstract of Japanese Patent—JP2001154223, dated Jun. 8, 2001, 2 pages.
Abstract of Japanese Patent—JP2004246280, dated Sep. 2, 2004, 2 pages.
Abstract of Japanese Patent—JPH04264529, dated Sep. 21, 1992, 2 pages.
Abstract of Japanese Patent—JPH07113731, dated Dec. 6, 1995, 2 pages.

* cited by examiner

*Primary Examiner* — Pegeman Karimi
(74) *Attorney, Agent, or Firm* — Dority & Manning, P.A.

(57) ABSTRACT

Provided herein is a liquid crystal device having a plurality of pixel areas defined by cross arrangement of a plurality of gate lines and data lines, the liquid crystal device comprising a reference data line that is one of the plurality of data lines; a first pixel electrode formed at one side of the reference data line, and is driven by the reference data line; a second pixel electrode formed at the other side of the reference data line, and is driven by a data line next to the reference data line; and a black matrix configured to shield the reference data line and its adjacent areas, wherein the distance between the center of the reference data line and the first pixel electrode is shorter than the distance between the center of the reference data line and the second pixel electrode.

1 Claim, 1 Drawing Sheet

LIQUID CRYSTAL DISPLAY DEVICE HAVING REDUCED-SIZED LIGHT LEAKAGE AREA

CROSS-REFERENCE TO RELATED APPLICATIONS

This application claims the benefit of priority under 35 U.S.C. §119(a) of Korean Patent Application No. 10-2013-0113385, filed on Sep. 24, 2013, in the Korean Intellectual Property Office, the entire disclosure of which is incorporated herein by reference for all purposes.

BACKGROUND

1. Field

The following description relates to a liquid crystal display device, for example, a liquid crystal display device comprising two pixel electrodes at both sides of one data line, each pixel electrode spaced from the data line by a different distance, more specifically, the distance from one data line to the pixel electrode that is driven by the data line being shorter than the distance from the data line to the other pixel electrode, thereby reducing the size of a black matrix and improving the aperture ratio.

2. Description of Related Art

In general, a liquid crystal display device comprises an upper substrate and a lower substrate disposed between a liquid crystal layer, wherein backlight may be illuminated from below or side of the lower substrate, so that a user may see images displayed in the device.

On the lower substrate, a plurality of gate lines and data lines are formed such that they cross one another, thus defining pixel areas. At one side of each pixel area, there is formed a thin film transistor for driving an electrode formed at each corresponding pixel area.

On the upper substrate, there is formed a color filter at a corresponding position of each pixel area, while at an area between each color filter and other area that needs light-shielding, there is formed a black matrix.

FIG. 1 is a schematic view of a conventional liquid crystal display device. With reference to FIG. 1, on a lower substrate 110, a first pixel electrode 112 and a second pixel electrode 113 are formed at the right and left side of one data line 111 that defines a pixel area together with a gate line.

Herein, a first pixel electrode 112 is electrically connected to a reference data line 111 that is disposed between the first pixel electrode 112 and a second pixel electrode 113 and becomes a reference, while the second pixel electrode 113 is electrically connected to another data line that is next to the reference data line 111.

Herein, it is desirable that each pixel electrode is disposed as close to a reference data line 111 as possible to improve the aperture ratio, but this may generate a pixel-data-capacitor between the pixel electrode and the reference data line 111, thereby causing a problem such as flickers etc. Thus, each pixel electrode is disposed with a certain distal (a=b) from the reference data line 111.

On the upper substrate 120, there is formed a black matrix 121 for sufficiently preventing light from coming out from a reference data line 111 and its adjacent area, that is, the area between the reference data line 111 and a first pixel electrode 112 and between the reference data line 111 and a second pixel electrode 113.

Herein, the black matrix 121 is formed such that the center of a reference data line 111 accords with the center of the black matrix 121, and that the part the extends towards the first pixel electrode 112 side is the same length as the part that extends towards the second pixel electrode 113 side.

However, such a black matrix 121 is formed such that it may sufficiently prevent light from coming out from the area between a reference data line 111 and a first pixel electrode 112 and between the reference data line 111 and a second pixel electrode 113, thereby deteriorating the aperture ratio, which is a problem.

SUMMARY

Therefore, the purpose of the present disclosure is to resolve the aforementioned problems of prior art, that is, to provide a liquid crystal display device comprising two pixel electrodes at both sides of one data line, each pixel electrode spaced from the data line by a different distance, more specifically, the distance from one data line to the pixel electrode that is driven by the data line being shorter than the distance from the data line to the other pixel electrode, thereby reducing the size of a black matrix and improving the aperture ratio.

In a general aspect, there is provided a liquid crystal device having a plurality of pixel areas defined by cross arrangement of a plurality of gate lines and data lines, the liquid crystal device comprising: a reference data line that is one of the plurality of data lines; a first pixel electrode formed at one side of the reference data line, and is driven by the reference data line; a second pixel electrode formed at the other side of the reference data line, and is driven by a data line next to the reference data line; and a black matrix configured to shield the reference data line and its adjacent areas, wherein the distance between the center of the reference data line and the first pixel electrode is smaller than the distance between the center of the reference data line and the second pixel electrode.

In the general aspect of liquid crystal device, the black matrix may be extended from the center of the reference data line towards the first pixel electrode side and the second pixel electrode side, the length of the black matrix from the center of the reference data line towards the first pixel electrode side being shorter than the length of the black matrix from the center of the reference data line towards the second pixel electrode side.

According to the present invention, there is provided a liquid crystal display device comprising two pixel electrodes at both sides of one data line, each pixel electrode spaced from the center of the data line by a different distance, more specifically, the distance from the center of one data line to the pixel electrode that is driven by the data line being shorter than the distance from the center of the data line to the other pixel electrode, thereby reducing the size of a black matrix and improving the aperture ratio.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
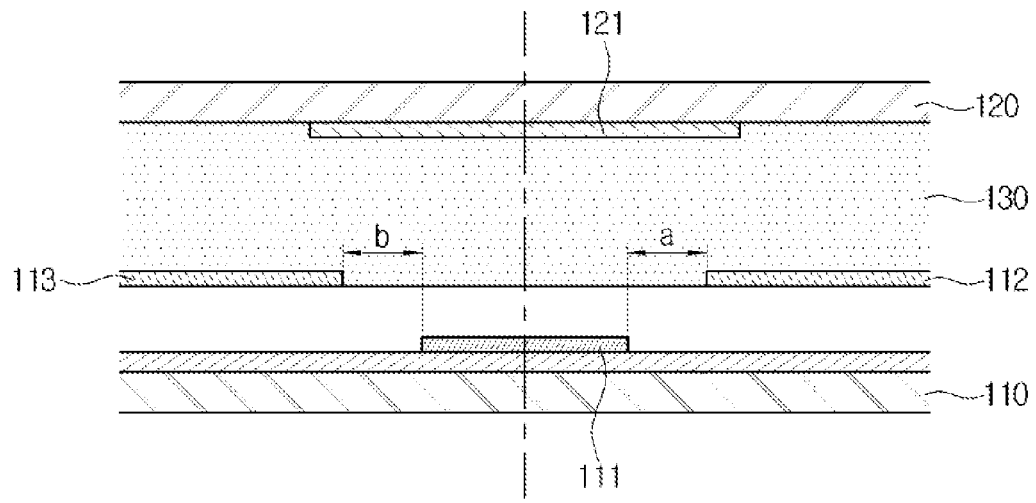
FIG. 1 is a schematic view of a conventional liquid crystal display device.
Figure 2:
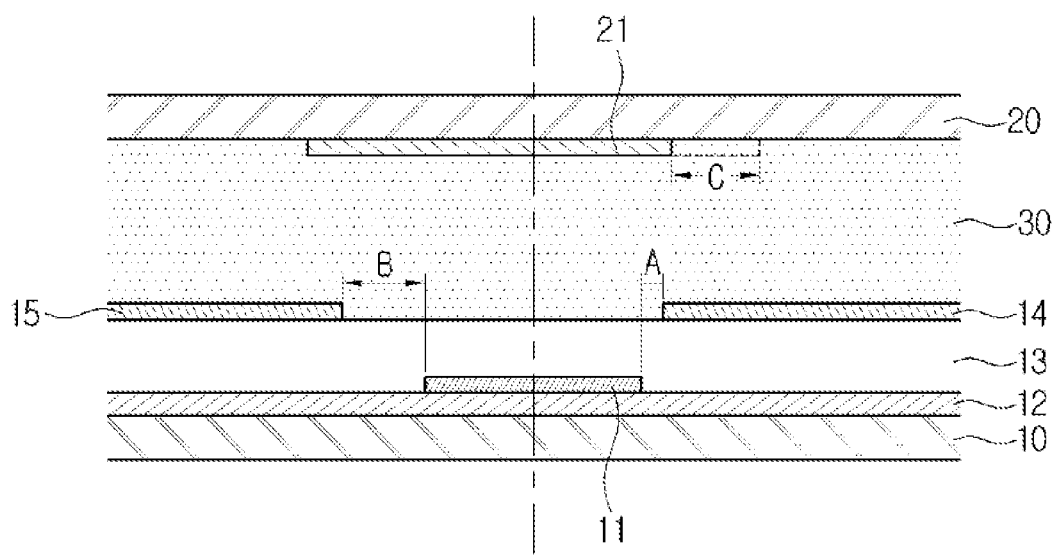
FIG. 2 is a schematic view of a liquid crystal display device according to an exemplary embodiment of the present disclosure.

FIG. 2 is a schematic view of a liquid display device according to an exemplary embodiment of the present disclosure. With reference to FIG. 2, the liquid display device according to an exemplary embodiment of the present disclosure comprises an upper substrate 20 and a lower substrate 10 with a liquid crystal layer 30 disposed therebetween.

Herein, on the lower substrate 10, a plurality of gate lines and data lines are formed such that they cross one another with a gate insulation layer 12 disposed therebetween, thereby defining a plurality of pixel areas, while on the upper portion of the lower substrate 10 where the gate lines and data lines are formed, an insulation layer 13 is formed.

Furthermore, at each pixel area, there is formed a pixel electrode for forming an electric field at the liquid crystal layer 30, and at one side of each pixel area, there is formed a thin film transistor for driving each pixel electrode.

Herein, the pixel electrodes formed at each pixel area are located at the left and right side of a reference data line 11, respectively.

Herein, the pixel electrode formed at the right side of the reference data line 11 is called a first pixel electrode 14, while the pixel electrode formed at the left side of the reference data line 11 is called a second pixel electrode 15.

The first pixel electrode 14 is driven by the reference data line 11, while the second pixel electrode 15 is driven by the data line next to the reference data line 11, that is, at the left side of the reference data line 11.

Herein, since the first pixel electrode 14 is driven by the reference data line 11, the first pixel electrode and the reference data line are equipotential, thus a pixel-data-capacitor is not generated between the first pixel electrode 14 and the reference data line 11.

In addition, the distance between the first pixel electrode 14 and the data line 11 is different from the distance between the second pixel electrode 15 and the data line 11, more specifically, the distance between the center of the reference data line 11 and the first pixel electrode 14 is shorter than the distance between the center of the reference data line 11 and the second pixel electrode 15.

Desirably, the first pixel electrode 14 is disposed such that the end of the first pixel electrode 14 facing the reference data line 11 side is as close as possible to the right end of the reference data line 11, or accords with the right end of the reference data line 11, or overlaps the reference data line 11.

Meanwhile, on the upper substrate 20, color filters are formed at corresponding positions of pixel areas, while at an area between each color filter and other area that needs light-shielding, there is formed a black matrix (21, light-shielding layer).

That is, the black matrix 21 blocks the light coming out through the distance (A) between the reference data line 11 and first pixel electrode 14 and the light coming out through the distance (B) between the reference data line 11 and second pixel electrode 15.

Since the distance (A) between the reference data line 11 and the first pixel electrode 14 is shorter than it used to be in prior art, it is possible to shield the distance (A) between the reference data line 11 and the first pixel electrode 14 even if the length of the black matrix 21 becomes shorter by as much length as C, thereby increasing the aperture ratio.

A number of examples have been described above. Nevertheless, it will be understood that various modifications may be made. For example, suitable results may be achieved if the described techniques are performed in a different order and/or if components in a described system, architecture, device, or circuit are combined in a different matter and/or replaced or supplemented by other components or their equivalents. Accordingly, other implementations are within the scope of the following claims.

DESCRIPTION OF REFERENCE NUMERALS

10: LOWER SUBSTRATE
11: REFERENCE DATA LINE
12: GATE INSULATION LAYER
13: INSULATION LAYER
14: FIRST PIXEL ELECTRODE
15: SECOND PIXEL ELECTRODE
20: UPPER SUBSTRATE
21: BLACK MATRIX
30: LIQUID CRYSTAL LAYER

What is claimed is:

1. A liquid crystal device having a plurality of pixel areas defined by cross arrangement of a plurality of gate lines and data lines, the liquid crystal device comprising:
a reference data line that is one of the plurality of data lines;
a first pixel electrode formed at one side of the reference data line, and is driven by the reference data line;
a second pixel electrode formed at the other side of the reference data line, and is driven by a data line next to the reference data line; and
a black matrix configured to shield the reference data line and its adjacent areas, wherein the reference data line is the only data line between the first pixel electrode and the second pixel electrode, the first pixel electrode and the second pixel electrode do not overlap the reference data line, the distance between the first pixel electrode and the reference data line is shorter than the distance between the second pixel electrode and the reference data line, the black matrix extends from the center of the reference data line towards a first pixel electrode side and a second pixel electrode side, and the length of the black matrix from the center towards the first pixel electrode side is shorter than the length of the black matrix from the center towards the second pixel electrode side.

* * * * *